US006833146B2

(12) United States Patent
Valencia et al.

(10) Patent No.: US 6,833,146 B2
(45) Date of Patent: Dec. 21, 2004

(54) POWERED BEVERAGE MIX WITH RAPIDLY DISSOLVING CALCIUM

(75) Inventors: Donna L. Valencia, Pasig (PH); Sarah A. Calapini, Mandaluyong (PH); Kennie U. Dee, Quezon (PH)

(73) Assignees: Unilab Pharmatech, Ltd., Central Hong Kong (CN); Domingo Diaz, Los Alto, CA (US)

( * ) Notice: Subject to any disclaimer, the term of this patent is extended or adjusted under 35 U.S.C. 154(b) by 207 days.

(21) Appl. No.: 10/190,968

(22) Filed: Jul. 8, 2002

(65) Prior Publication Data

US 2004/0009280 A1 Jan. 15, 2004

(51) Int. Cl.[7] .............................................. A23L 1/304
(52) U.S. Cl. ........................ 426/74; 426/518; 426/590
(58) Field of Search .......................... 426/74, 590, 518

(56) References Cited

U.S. PATENT DOCUMENTS

| 4,722,847 A | 2/1988 | Heckert ........................ 426/74 |
| 4,737,375 A | 4/1988 | Nakel et al. ................. 426/590 |
| 4,772,467 A | 9/1988 | Pak ............................. 424/127 |
| 4,851,221 A | 7/1989 | Pak et al. .................... 424/693 |
| 4,871,554 A | 10/1989 | Kalala et al. ................. 426/74 |
| 5,128,374 A | 7/1992 | Kochanowski ............... 514/574 |

OTHER PUBLICATIONS

Walpole, Ronald E. and Myers, Raymond H., "Probability and Statistics for Engineers and Scientists." Fifth Edition. p. 365–383.

*Primary Examiner*—Helen Pratt
(74) *Attorney, Agent, or Firm*—Wall Marjama & Bilinski LLP

(57) ABSTRACT

The present invention provides a powdered beverage mix, comprising i) flavor(s), ii) calcium hydroxide, iii) citric and/or malic acid and, iv) a sugar selected from sucrose, fructose, glucose, and combinations thereof, wherein the ratios of acid/sugar and sugar/calcium are selected such that the calcium in the powdered beverage mix dissolves rapidly with very minimal calcium sedimentation when stirred by hand for less than about 60 seconds.

43 Claims, 5 Drawing Sheets

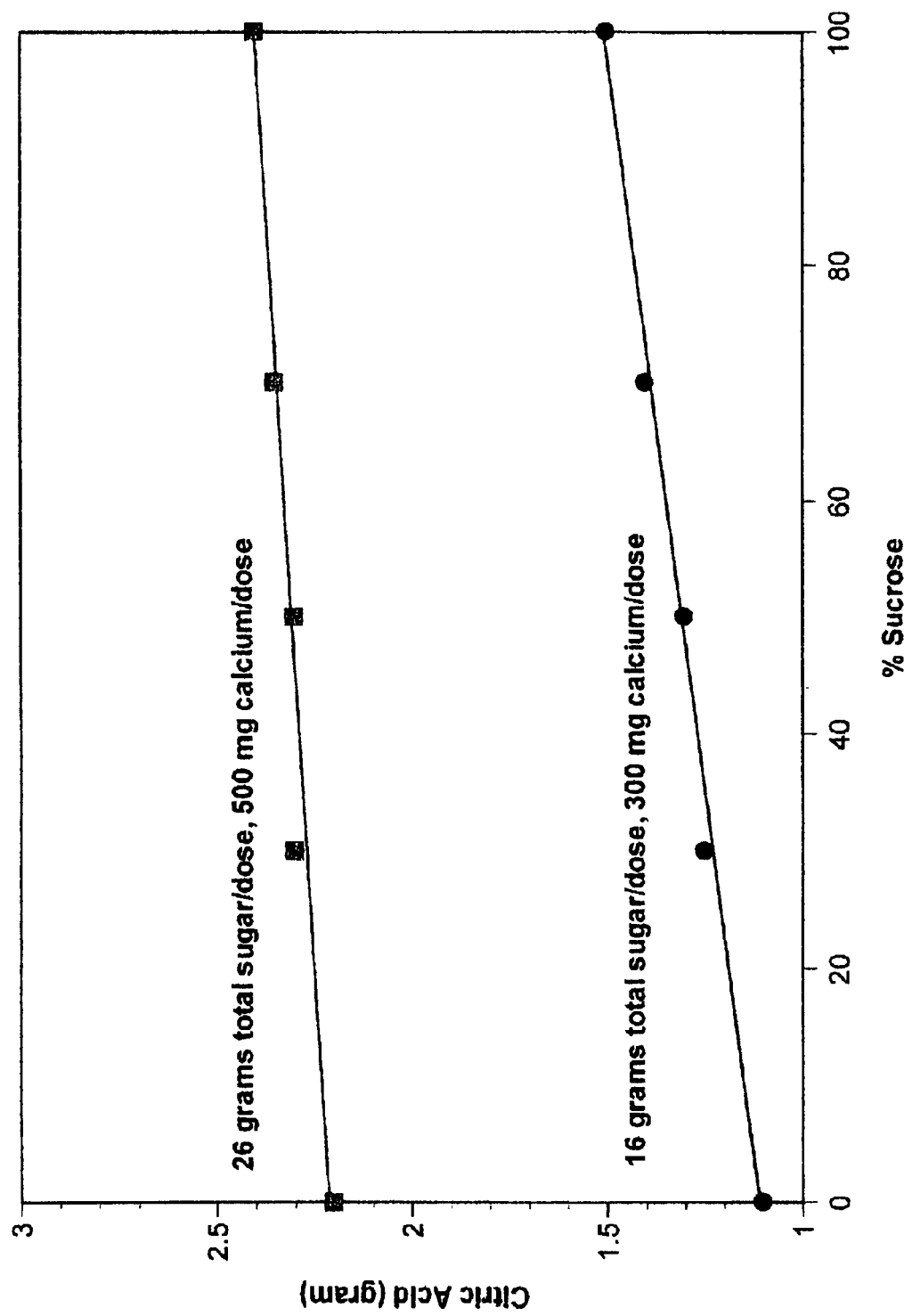

POWERED BEVERAGE MIX WITH RAPIDLY DISSOLVING CALCIUM

BACKGROUND OF THE INVENTION

1. Field of the Invention

The invention pertains to the field of beverage formulations. More particularly, the invention pertains to formulations of powdered beverage mix containing rapidly dissolving calcium.

2. Description of Related Art

Calcium is the most abundant mineral in the body and is a major constituent of bone and teeth. Calcium is also involved in several physiological systems such as blood clotting, increasing cell membrane permeability, activating a number of enzymes, and acting as component in neural transmission and muscular contraction. Calcium deficiency may be a factor in the development of osteoporosis in elderly people.

Since the body does not produce calcium, it is totally dependent on external supply of calcium, which is nutritional or supplementary. Calcium may be obtained from various dietary sources, of which the primary sources are dairy products, in particular milk. Milk, however, is not generally consumed in sufficient quantities by the general population to obtain needed levels of calcium. One reason is that milk may be unattractive as a drink for social occasions. Also, a significant number of individuals are lactose intolerant, resulting in gastrointestinal problems if milk is consumed.

To increase the consumption of calcium, a more appealing alternative to milk is apparently needed. Beverages, which are consumed often by the general public, have been used as a vehicle for achieving greater calcium intake. Calcium supplementation in beverages, however, has been generally limited to liquid beverages. For example, Sunny Delight® Orange with Calcium of Procter and Gamble, Cincinnati, Ohio, USA, contains calcium citrate malate and is labeled as being protected by U.S. Pat. No. 4,737,375. Tropicana® Orange with Calcium of Tropicana Products, Inc., Bradenton, USA, also contains calcium citrate malate and is labeled as being protected by U.S. Pat. No. 4,722,847. Minute Maid® Orange with Calcium of the Coca-Cola Company, Houston, Tex., USA, contains calcium lactate and tricalcium phosphate according to U.S. Pat. No. 4,871,554.

Powdered beverage mix, which is reconstituted with water before drinking, is a potentially good vehicle for calcium delivery given the popularity of such brands as Kool-Aid® and Country Time® of Kraft Foods Inc., White Plains, N.Y., USA. Powdered beverage mix has a longer shelf life and is more portable than liquid beverages.

A significant problem with calcium supplementation of powdered beverage mix is that the calcium source must rapidly dissolve, within less than about 60 seconds of stirring by hand. When highly soluble salts of calcium are used, undesirable taste becomes a problem. For example, calcium acetate tastes vinegary, calcium chloride salty. When insoluble salts are used, grittiness can be a problem; moreover, the calcium source sediments rapidly out of solution which makes the reconstituted product aesthetically unpleasant, and which may lead to incomplete intake of the added calcium.

It has been found that organic salts of calcium are generally more bioavailable than the inorganic salts. For example, U.S. Pat. Nos. 4,772,467 and 5,128,374 teach the use of calcium citrate and calcium citrate malate, respectively, to treat osteoporosis. Calcium citrate and calcium malate are fairly insoluble and their direct use in powdered beverage mix can lead to problems previously described with insoluble calcium salts. However, calcium citrate can be formed in-situ by reacting a fairly insoluble calcium base selected from calcium carbonate, calcium oxide, and calcium hydroxide with citric acid as described in U.S. Pat. No. 4,851,221. The calcium citrate thus formed is in a metastable state, which eventually precipitates to the low equilibrium solubility of calcium citrate. Long-term stability of the metastable calcium citrate is not important in a powdered beverage mix as the reconstituted beverage is used immediately.

U.S. Pat. No. 4,851,221, however, does not teach the formulation of a powdered beverage mix containing calcium hydroxide and citric acid where on constitution with water, the acid-base reaction occurs very rapidly resulting in no visible or very minimal calcium sedimentation when stirred by hand for less than about 60 seconds.

SUMMARY OF THE INVENTION

The present invention provides a powdered beverage mix comprising i) flavor(s), ii) calcium hydroxide, iii) citric and/or malic acid and, iv) a sugar selected from sucrose, fructose, glucose, and combinations thereof, wherein the ratios of acid/sugar and sugar/calcium are selected such that the calcium in the powdered beverage mix dissolves rapidly with very minimal calcium sedimentation when stirred by hand for less than about 60 seconds.

BRIEF DESCRIPTION OF THE DRAWING

FIG. 5 shows the citric acid required to dissolve calcium in about 60 seconds as the fraction of sucrose is varied in a sucrose/glucose combination at fixed calcium dosage and total sugar level.

DETAILED DESCRIPTION OF THE INVENTION

Test Method

Simulated Hand Stirring

Figure 1:
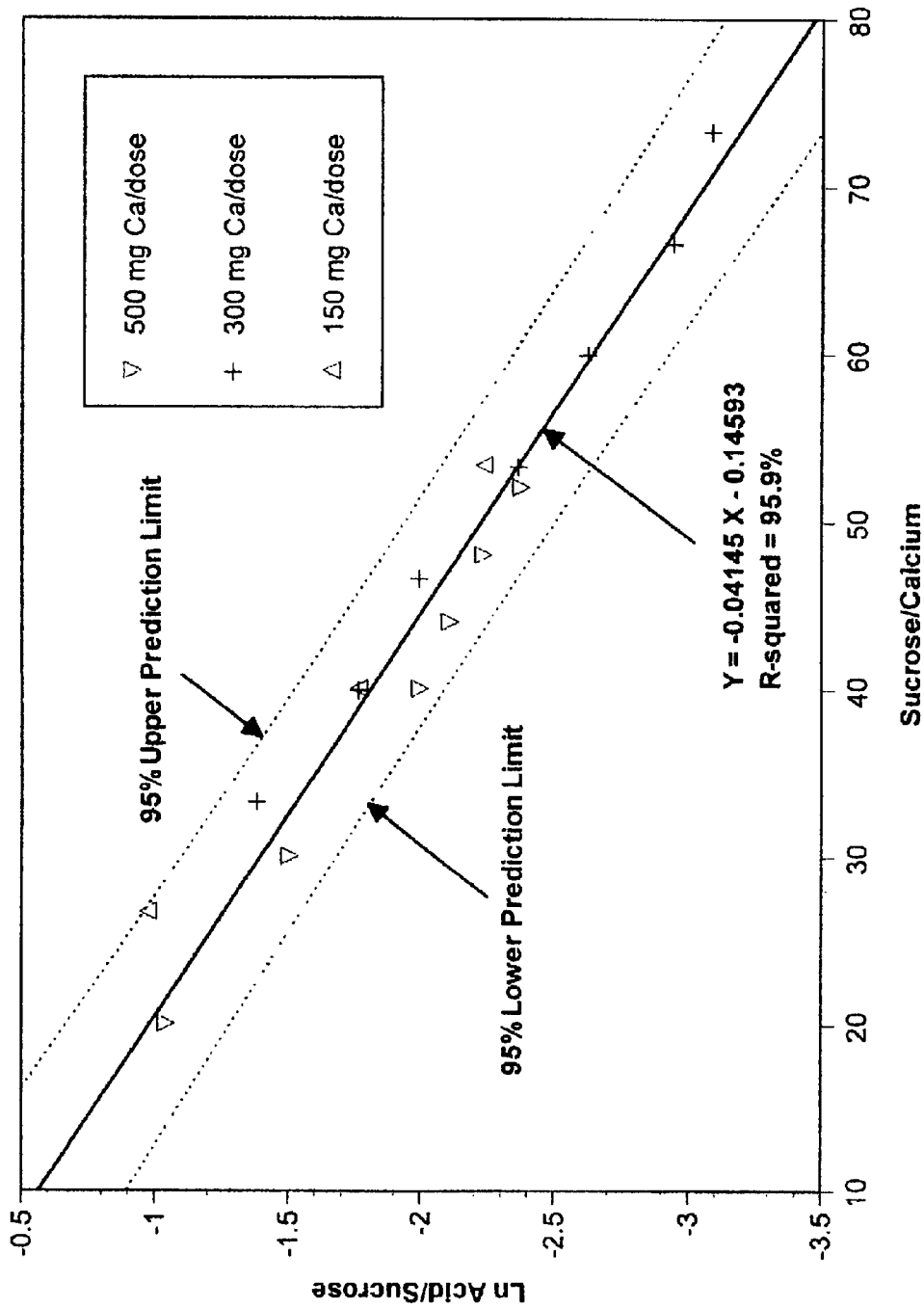
FIG. 1 shows a plot of the sucrose/calcium weight ratio versus the logarithm of the acid/sucrose weight ratio required to dissolve the calcium in about 60 seconds.

A magnetic stir bar (9.5x50.8 mm, catalogue no. 58948-980, VWR Spinbar®, USA) is placed in a 250-ml Pyrex® beaker (catalogue no. 1000-250, Corning, USA) to which 200 ml of water at 25° C. is added. The beaker is placed on top of a digital magnetic stirrer (Cole Parmer, USA) and the speed set at 200 rpm. A unit dose of a powdered mix is then added to the water and stirred for a given period of time, after which the beaker is removed and calcium sedimentation evaluated on a 1–10 scale, with 1 denoting no visible calcium sedimentation. A rating of 2 denoting very minimal calcium sedimentation, which is visually acceptable, is set as the minimum dissolution criterion.

Hereafter, this test will be referred to as the "Simulated Hand Stirring Test". When the stirring time is 60 seconds, the test is referred to as the "60-second Simulated Hand Stirring Test".

Discussion

U.S. Pat. No. 4,851,221 discloses a dry powder mixture containing citric acid and a calcium base selected from calcium hydroxide, calcium oxide, and calcium carbonate, which may be used for making an instant liquid beverage of soluble calcium citrate. The patent, however, does not teach how to formulate a powdered beverage mix containing calcium hydroxide and citric acid that on constitution with water provides a solution with minimal calcium sedimentation when stirred by hand for less than about 60 seconds. Rapid dissolution is very important since consumers will not stir for more than 60 seconds after adding the powdered beverage mix to water, or vice versa, and it is very inconvenient to use a high-speed blender every time to do the mixing.

In this instant invention, we have surprisingly found that powdered beverage formulations containing calcium hydroxide and citric acid can be made to dissolve rapidly with minimal calcium sedimentation by incorporating a sugar selected from sucrose, glucose, fructose, and combinations thereof, and selecting the proper weight ratios of acid/sugar and sugar/calcium. We have also found that citric acid can be replaced with an equal weight of malic acid, or an equal weight of citric and malic acid combinations. Without wishing to be bound by theory, it is believed that the presence of the sugar separates the calcium hydroxide particles preventing their agglomeration during constitution with water; in addition, the rapid dissolution of the sugar provides a certain amount of microscale mixing that enhances the reaction between calcium hydroxide and the acid.

Calcium Hydroxide

U.S. Pat. No. 4,851,221 discloses that the calcium base can be selected from calcium hydroxide, calcium oxide, and calcium carbonate. Our experiments indicate that only calcium hydroxide will react fast enough with the acid in the presence of appropriate amount of sugar to reproducibly provide a solution with minimal calcium sedimentation when the powdered mix is constituted with water and stirred for less than about 60 seconds by hand. Calcium oxide may not react fast enough since it has to hydrate first to calcium hydroxide before reaction with the acid can occur. Moreover, we found that when calcium oxide is used, dissolution usually slows down in the presence of flavors, as well as with the age of the powdered mix. In the case of calcium carbonate, which is a hundred times less soluble than calcium hydroxide, its poor solubility affects the rate at which it goes into solution to react with the acid.

The average particle size of calcium hydroxide should be less than about 30 micron, preferably less than about 20 micron, and most preferably less than about 10 micron. The calcium hydroxide should pass the FCC III (Food Chemicals Codex) monographs requiring the purity to be at least 95% w/w.

Calcium hydroxide has very poor solubility in water of about 0.17 gram per 100 ml of water. When used alone, without reacting with an acid, calcium hydroxide sediments out of solution rapidly giving a very visually unappealing constituted liquid.

Citric and Malic Acid

Since both acids are very soluble in water, greater than 50 grams per 100 ml of water, the particle size is not very critical. Commercially available granular citric and malic acid with average particle sizes less than about 600 micron can be used.

The weight of citric acid relative to malic acid required to neutralize calcium hydroxide differs by about 4%, so for all practical purposes, the same weight required for neutralization can be assumed. In this instant invention, we have found that citric acid can be replaced with an equal weight of malic acid, or equal weight of a combination of both acids. The insensitivity to the source of the acid may be explained by the fact that both acids are very soluble relative to calcium hydroxide (approximately 300 times more soluble) and therefore what dictates the rate of acid-base neutralization is the dissolution rate of calcium hydroxide.

Sugar

The sugar is selected from sucrose, fructose, glucose, and combinations thereof. These sugars are very soluble with solubility in excess of 90 grams per 100 ml of water. The particle size is not very critical. Preferably, however, the average particle size by weight of the sugar is less than about 841 micron (mesh 20), more preferably less than about 595 micron (mesh 30).

Hereafter, the word "sugar" will be used to refer to sucrose, fructose, and glucose; and the word "monosaccharide" is used to refer to glucose, fructose, or combinations thereof.

Flavor

The term flavor includes both natural and artificial flavors. The amount of flavor employed depends on the selected flavor(s), the flavor impression desired, and the form of the flavor component.

Other Ingredients

In addition to flavor(s), sugar, calcium hydroxide, citric and/or malic acid, the powdered beverage mix may contain other ingredients normally found in powdered beverage mix, including but not limited to colorants; preservatives; cloudifiers; high-intensity artificial sweeteners; vitamins and minerals; anticaking agents such as calcium phosphate and magnesium oxide; pH modifiers such as sodium citrate and potassium citrate; viscosity modifiers or bodying agents such as guar gum, gum tragacanth, gum arabic, pectin, xanthan gum, and carrageenan; antioxidants; and emulsifying agents.

The calcium hydroxide, sugar, and acid should preferably comprise greater than about 85% w/w, more preferably greater than 90% w/w, and most preferably greater than 95% w/w of the final powdered beverage mix.

Experiment 1

Various combinations of calcium hydroxide (average particle size 3.5 micron, 97% purity, K. D. Fedderson Co., Germany), citric acid, and granular sucrose (through mesh 20) were dry mixed and unit doses subjected to the Simulated Hand Stirring Test. For each unit dose with defined calcium hydroxide and sucrose level, the amount of citric acid required to pass the 60-second Simulated Hand Stirring Test was determined.

FIG. 1 is a plot of the sucrose/calcium weight ratio versus the natural logarithm of the acid/sucrose weight ratio, showing that a good correlation is achieved with a simple linear regression as shown by the solid line and described by the equation:

$$Y_p = \ln \frac{acid}{sucrose} = -0.14593 - 0.04145X \qquad (1)$$

Where $Y_p$ is the predicted acid/sucrose ratio required for acceptable dissolution at 60 seconds for a given X, the sucrose/calcium ratio. Note that calcium hydroxide is expressed in terms of equivalent calcium so that the calcium per unit dose is readily apparent. Also, the general term "acid" is used since malic acid or a combination of citric and malic acid can be used to replace citric acid on an equal weight basis and the same results as in FIG. 1 obtained.

The linear regression line of FIG. 1 is bound by the 95% prediction limits, of which the lower prediction limit is the important one. The acid/sucrose ratio must be above the lower prediction limit to ensure that the powdered mix meets the calcium dissolution criterion of 60 seconds. In other words, the powdered mix must be in the area above the lower prediction limit so that the calcium will dissolve rapidly with minimal sedimentation in a stirring time of less than about 60 seconds. The farther away a formulation is from the lower prediction limit, the less time it requires to dissolve the calcium in the powdered mix.

The 95% lower prediction limit is calculated by known equations in statistics (Walpole and Myers, Probability and Statistics for Engineers and Scientists, MacMillan Publishing, 5th ed., pp. 381–383). Specifically:

$$Y_{Lower\ Limit} = Y_P - t_{\alpha/2} s \sqrt{1 + \frac{1}{n} + \frac{(X - \overline{X})^2}{S_{xx}}} \quad (2)$$

Where:

$n$ = number of observations $\overline{X}$ = Average of the $X$'s $S_{xx} = \sum (X - \overline{X})^2$ $s = \sqrt{\sum \frac{(Y_{actual} - Y_P)^2}{n-2}}$ $t_{\alpha/2}$ = value of the t-distribution with n–2 degrees of freedom For the data set of FIG. 1 with n=16, $t_{0.025}$=2.145 for 14 degrees of freedom, equation (2) simplifies to:

$$Y_{Lower\ Limit} = Y_P - (2.145)(0.12707)\sqrt{1 + \frac{1}{16} + \frac{(X - 45.4583)^2}{3091.75}} \quad (3)$$

To determine the minimum acid required for a powdered mix, the calcium dosage and sucrose level per unit dose are first set, and $Y_P$ calculated from equation (1). $Y_{Lower\ Limit}$ is then calculated from equation (3), and the amount of acid required per unit dose can then be determined from:

$$Acid_{Lower\ Limit} = (sucrose/dose) Exp(Y_{Lower\ Limit}) \quad (4)$$

Since constitution instructions are not strictly followed, the amount of water used for a unit dose of a powdered beverage mix may vary between 150 ml and 300 ml. FIG. 1 indicates that this should not be a problem as long as the sucrose/calcium and acid/sucrose weight ratios of the powdered mix are selected properly. Although FIG. 1 was generated with 200 ml of water for constitution, the correlation is on the sucrose/calcium and acid/sucrose ratios of the dry mix, and exclude the water used for constitution which means that water of constitution can be varied and the powdered mix will still dissolve as long as the acid per unit dose is equal to or greater than $Acid_{Lower\ Limit}$ calculated from equation (4).

Figure 2:
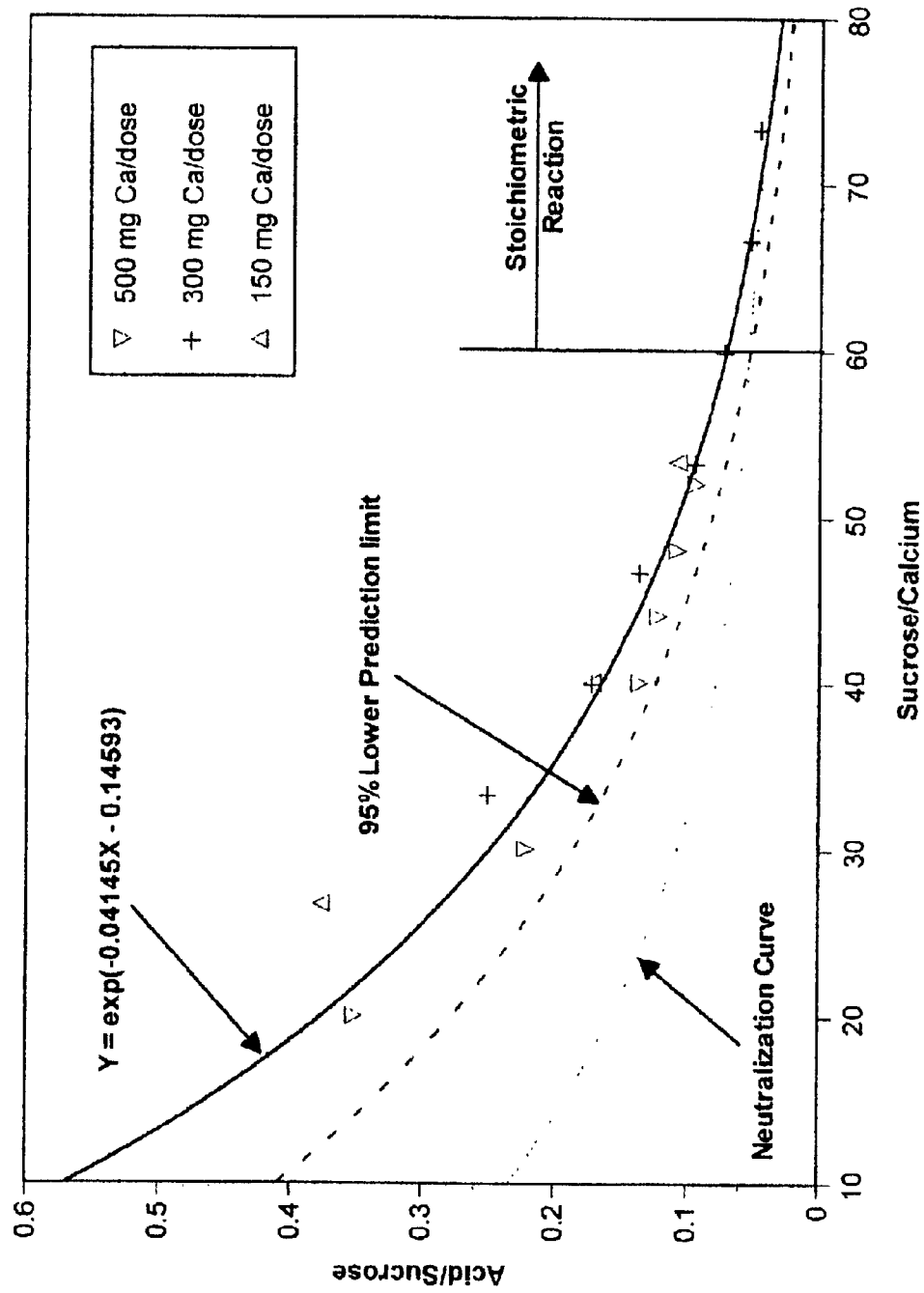
FIG. 2 is a similar plot to FIG. 1 except the Y-axis is expressed directly as the acid/sucrose ratio rather than its logarithm.

FIG. 1 is re-plotted in FIG. 2 with the Y-axis expressed as acid/sucrose rather than its logarithm. The 95% lower prediction limit in FIG. 2 is obtained from equation (4), thus:

$$\frac{Acid_{Lower\ Limit}}{sucrose} = Exp(Y_{Lower\ Limit}) \quad (5)$$

The neutralization curve, which represents the amount of acid to completely neutralize the calcium hydroxide, is obtained by noting that:

$$\frac{acid}{sucrose} \times \frac{sucrose}{calcium} = \frac{acid}{calcium} = 3.20 \quad (6)$$

The number 3.20 in the above equation is obtained as follows: since 1.73 grams of citric acid will completely neutralize 1 gram of calcium hydroxide (equal to 0.54 gram calcium), the acid/calcium ratio for complete neutralization is thus 1.73/0.54=3.20. Equation (6) can be rearranged to:

$$\frac{acid}{sucrose} = \frac{3.20}{sucrose/calcium} \quad (7)$$

Various values of sucrose/calcium are inputted in equation (7), and their corresponding acid/sucrose ratios calculated and then plotted to give the neutralization curve as shown in FIG. 2.

FIG. 2 shows that the neutralization curve intersects the 95% lower prediction limit at a sucrose/calcium ratio of 60. In other words, for sucrose/calcium ratio equal to or greater than 60, the amount of acid required is the amount for complete neutralization of the calcium hydroxide. In summary:

For sucrose/calcium weight ratio between 20 and 60:

The acid must be equal to or greater than the amount of acid calculated from the 95% lower prediction limit of FIG. 2.

For sucrose/calcium weight ratio equal or greater than 60:

The acid must be equal to or greater than the amount required to completely neutralize the calcium hydroxide.

Experiment 2

Experiment 1 was repeated, but this time with fructose and glucose at different levels of calcium per unit dose. The linear regression line of FIG. 3 is given by:

$$Y_P = \ln \frac{acid}{monosaccharide} = -0.94015 - 0.03262X \quad (8)$$

Figure 3:
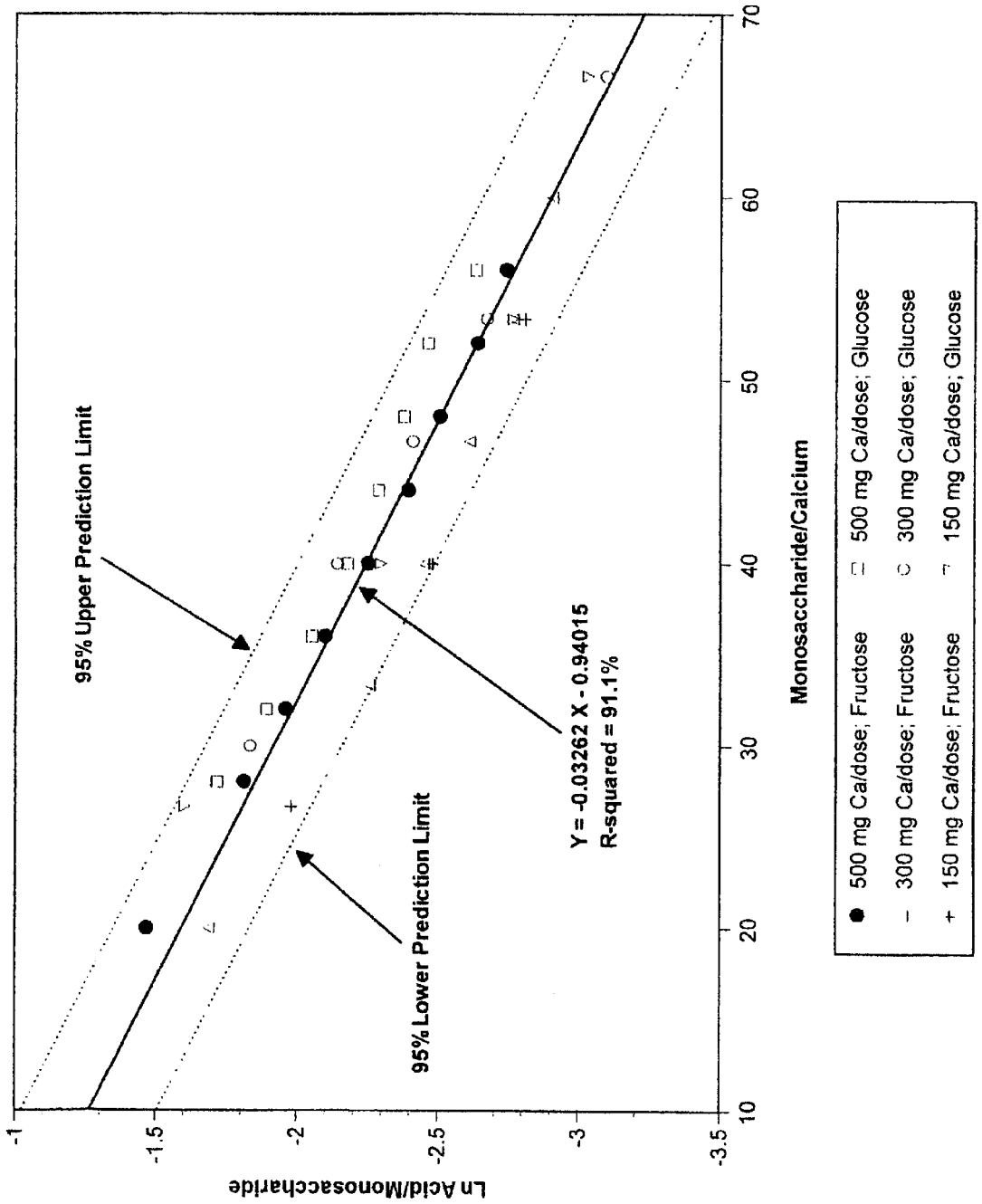
FIG. 3 shows a plot of the monosaccharide/calcium weight ratio versus the logarithm of the acid/monosaccharide weight ratio required to dissolve the calcium in about 60 seconds.

A single regression line is adequate to describe both glucose and fructose, and by inference combinations thereof (validated by experiments but not included in FIG. 3). The word "monosaccharide" therefore is used to mean glucose, fructose, or combinations thereof.

The 95% lower prediction limit for the data set of FIG. 3 is given by:

$$Y_{Lower\ Limit} = Y_P - (2.036)(0.11564)\sqrt{1 + \frac{1}{35} + \frac{(X - 42.5333)^2}{5105.6}} \quad (9)$$

Figure 4:
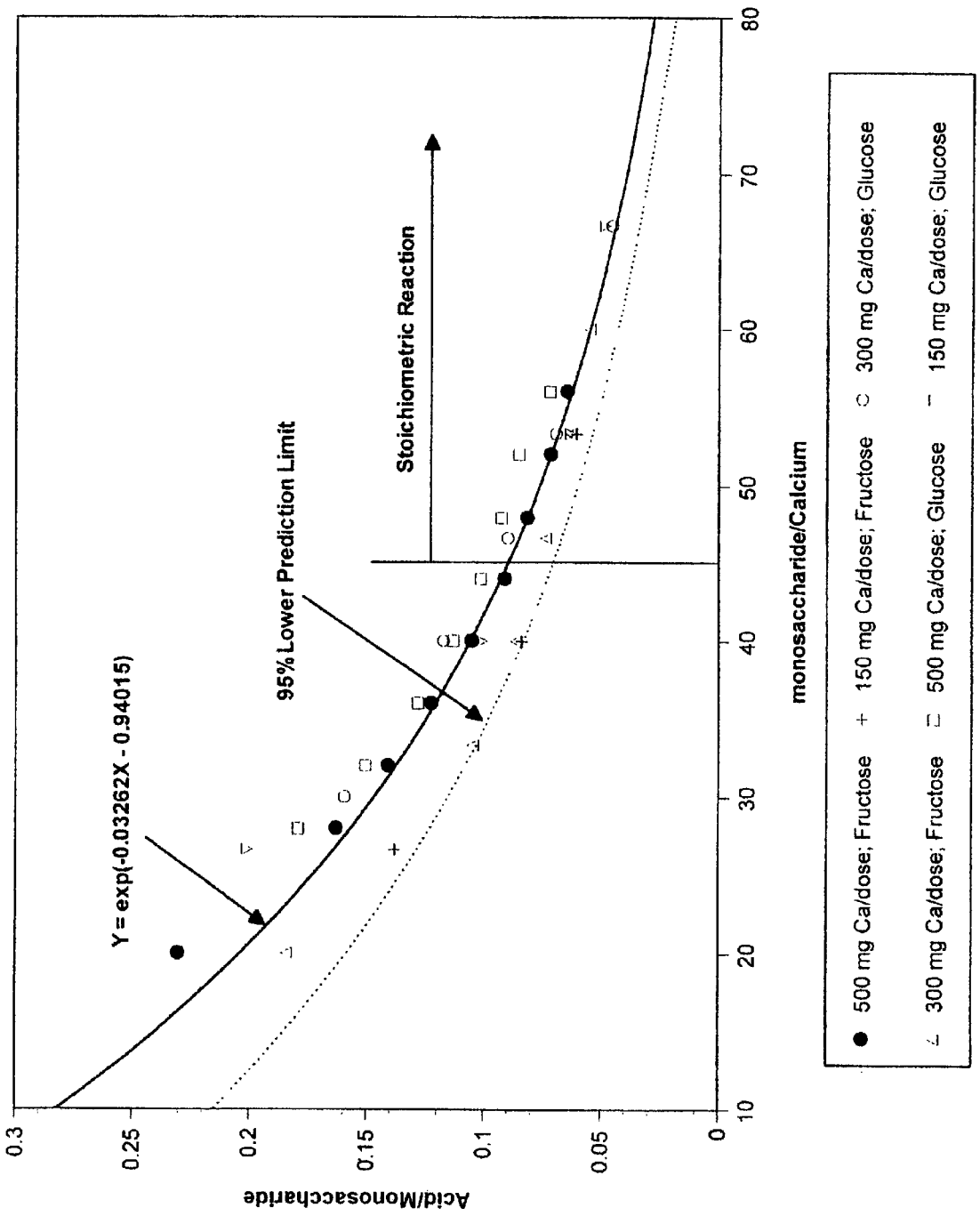
FIG. 4 is a similar plot to FIG. 3 except the Y-axis is expressed directly as the acid/monosaccharide ratio rather than its logarithm.

FIG. 3 is re-plotted in FIG. 4 with the Y-axis expressed as acid/monosaccharide rather than its logarithm. The neutralization curve (not shown) intersects that 95% lower prediction limit curve at a monosaccharide/calcium of 45, giving the following formulation rules:

For monosaccharide/calcium weight ratio between 20 and 45:

The acid must be equal to or greater than the amount of acid calculated from the 95% lower prediction limit of FIG. 4.

For monosaccharide/calcium weight ratio equal or greater than 45:

The acid must be equal to or greater than the amount required to completely neutralize the calcium hydroxide.

Experiment 3

To determine if a simple "mixture" rule will apply when sucrose is used in combination with a monosaccharide, the percent sucrose (sucrose/total sugar) in a fixed weight of sucrose/glucose combination was varied, while keeping calcium constant, and the citric acid required to pass the 60-second Simulated Hand Stirring Test measured.

The results are shown in FIG. 5 for two sugar levels. The left Y-axis represents the amount of citric acid required if 100% glucose is used, while the right Y-axis represents the amount of citric acid required if 100% sucrose is used. Since the citric acid required when the percentage of sucrose is varied falls on a straight line connecting the two extreme citric points (100% glucose and 100% sucrose), then a simple mixture rule is adequate. In other words: (i) determine the acid required for pure sucrose by assuming all the sugar to be sucrose; (ii) determine the acid required for pure monosaccharide by assuming all the sugar to be monosaccharide; (iii) calculate the $Acid_{Lower\ Limit}$ required for the sugar combination from the following equation:

$Acid_{Lower\ Limit}$=(fraction sucrose)×(acid required assuming all the sugar is sucrose)+(fraction monosaccharide)×(acid required assuming all the sugar is monosaccharide)    (10)

The acid for the combination sugar must be equal or greater than the $Acid_{Lower\ Limit}$ value calculated from equation (10).

Experiment 4

The sugars of this instant invention were compared to sugar alcohols to determine the relative efficiency in enhancing the reaction between calcium hydroxide and acid. In this experiment, the amount of calcium hydroxide was set to provide 300 mg calcium per unit dose, the amount of citric acid set at 0.96 gram per unit dose for complete neutralization, and the amount of sweetener per unit dose required to pass the 60-second Simulated Hand Stirring Test was determined.

TABLE 1

| Sweetener | Sweetener/calcium ratio to pass 60-second Simulated Hand Stirring Test |
|---|---|
| Sucrose | 60 |
| Glucose or Fructose | 45 |
| Sorbitol | 95 |
| Xylitol | 133 |
| Erythritol | >150 |

The above results clearly show that sucrose, fructose, and glucose required lower levels than the sugar alcohols to dissolve the calcium. Note that the sugar alcohols should be avoided when formulating powdered beverage mix containing calcium hydroxide and acid since the high levels required can cause diarrhea due to high osmolarity (sugar alcohols are not absorbed by the body).

Experiment 5

The effect of the particle size of fructose on the citric acid level required to pass the 60-second Simulated Hand Stirring Test was studied.

TABLE 2

| Particle Size | Fructose/Dose | Calcium/Dose | Acid required/Dose |
|---|---|---|---|
| On Mesh 20* | 22 g | 500 mg | 2.0 |
| On Mesh 20 | 16 g | 300 mg | 1.0 |
| On Mesh 20 | 6 g | 150 mg | 0.5 |
| Through mesh 40* | 22 g | 500 mg | 2.0 |
| Through mesh 40 | 16 g | 300 mg | 1.0 |
| Through mesh 40 | 6 g | 150 mg | 0.5 |

*On mesh 20 > 841 micron; through mesh 40 < 420 micron

The results indicate that the particle size of sugar is not an important factor in the neutralization rate of the calcium hydroxide and acid, consistent with the explanation that the reaction rate is dictated by the less soluble calcium hydroxide.

Experiment 6

A unit dose of 555 mg calcium hydroxide (300 mg calcium) and 26 grams sucrose was prepared with increasing levels of flumaric acid. For a sucrose/calcium ratio of 26/0.3=87, one would only require the stoichiometric amount of either citric or malic acid to dissolve the calcium in 60 seconds. In the case of fumaric acid, which requires 0.87 gram to react with 555 mg calcium hydroxide, increasing the amount of fumaric to three times the stoichiometric amount still resulted in significant calcium sedimentation, as well as fumaric acid sedimentation. Fumaric acid is fairly insoluble at 0.63 gram in 100 ml of water, only about four times more soluble than calcium hydroxide, compared to citric and malic acid which are about 300 times more soluble than calcium hydroxide. This experiment shows that the acid used in the powdered mix formulation of the instant invention must be very soluble relative to calcium hydroxide.

Experiment 7

A 30-kg batch of a powdered orange beverage mix with the following formulation was prepared in a sigma mixer.

TABLE 3

| Ingredients | % w/w | in 31 grams (unit dose) |
|---|---|---|
| Sucrose (through mesh 20) | 86.2% | 26.72 g |
| Citric Acid | 8.4% | 2.60 g |
| Calcium Hydroxide-97% | 3% | 0.93 g (487 mg calcium) |
| Yellow 6 | 0.02% | 6.2 mg |
| Yellow 5 | 0.026% | 8.1 mg |
| Orange Flavors | 1.25% | 387 mg |
| Xanthan Gum | 0.2% | 62 mg |
| Cloudifier Permaseal ® | 0.6% | 186 mg |
| Vitamin C | 0.3% | 93 mg |

The sugar and dyes were loaded into the sigma mixer and blended for 15 minutes. Citric acid and Vitamin C were then added to the mixer and blended for 15 minutes, after which calcium hydroxide, xanthan gum, and the cloudifier were added and blended for another 15 minutes. Finally, the flavors were added and the final mix blended for 15 minutes.

A unit dose of this powdered orange beverage mix is 31 grams. The sucrose/calcium ratio is 26.72/0.487=54.87. The calculated $Y_p$ from equation (1) is −2.4203, and $Y_{Lower\ Limit}$ from equation (3) is −2.705, and therefore the $Acid_{Lower\ Limit}$ calculated from equation (4) is 1.79 grams per unit dose. The actual amount of acid in this formulation is 2.60 grams per unit dose, and as expected the powdered mix formulation dissolved with minimal calcium sedimentation in less than about 60 seconds. The actual calcium dissolution time as determined by the Simulated Hand Stirring Test, and validated with actual hand stirring by consumers, is less than 30 seconds. The powdered orange beverage mix of this experiment tastes good with no chalky aftertaste.

Experiment 8

A 10-kg batch of a powdered pink lemonade beverage mix with the following formulation was prepared in a sigma mixer.

TABLE 4

| Ingredients | % w/w | in 30 grams (unit dose) |
|---|---|---|
| Sucrose (through mesh 20) | 91.8% | 27.54 g |
| Malic Acid | 4.7% | 1.41 g |
| Calcium Hydroxide-97% | 1.9% | 0.57 g (300 mg calcium) |
| FD&C Red 40 colorant | 0.002% | 0.6 mg |
| Lemon Flavors | 0.6% | 180 mg |
| Xanthan Gum | 0.2% | 60 mg |
| Cloudifier Permaseal ® | 0.5% | 150 mg |
| Vitamin C | 0.28% | 84 mg |

The sugar and dye were loaded into the sigma mixer and blended for 15 minutes. Malic acid and Vitamin C were then added to the mixer and blended for 15 minutes, after which calcium hydroxide, xanthan gum, and the cloudifier were added and blended for another 15 minutes. Finally, the flavors were added and the final mix blended for 15 minutes.

A unit dose of this powdered beverage mix is 30 grams. The sucrose/calcium ratio is 27.54/0.3=91.8. Since the sucrose/calcium ratio is greater than 60, the amount of acid required must be equal to or greater than the acid required for complete neutralization which in this case is 3.20 grams acid/gram calcium×0.3 gram calcium=0.96 gram acid. The actual amount of acid in this formulation is 1.41 grams per unit dose, and as expected the powdered mix formulation dissolved with minimal calcium sedimentation in less than about 60 seconds. The actual calcium dissolution time as determined by the Simulated Hand Stirring Test, and validated with actual hand stirring by consumers, is less than 30 seconds. The powdered pink lemonade beverage mix of this experiment tastes good with no chalky aftertaste.

Experiment 9

A 10-kg batch of a powdered pink lemonade beverage mix with the following formulation was prepared in a sigma mixer.

TABLE 5

| Ingredients | % w/w | in 30 grams (unit dose) |
|---|---|---|
| Sucrose (through mesh 20) | 89.8% | 26.94 g |
| Citric Acid | 6.7% | 2.01 g |
| Calcium Hydroxide-97% | 1.9% | 0.57 g (300 mg calcium) |
| FD&C Red 40 colorant | 0.002% | 0.6 mg |
| Lemon Flavors | 0.6% | 180 mg |
| Xanthan Gum | 0.2% | 60 mg |
| Cloudifier Permaseal ® | 0.5% | 150 mg |
| Vitamin C | 0.28% | 84 mg |

The sugar and dye were loaded into the sigma mixer and blended for 15 minutes. Citric acid and Vitamin C were then added to the mixer and blended for 15 minutes, after which calcium hydroxide, xanthan gum, and cloudifier were added and blended for another 15 minutes. Finally, the flavors were added and the final mix blended for 15 minutes.

A unit dose of this powdered beverage mix is 30 grams. The sucrose/calcium ratio is 26.94/0.3=89.8. Since the sucrose/calcium ratio is greater than 60, the amount of acid required must be equal to or greater than the acid required for complete neutralization which in this case is 3.20 grams acid/gram calcium×0.3 gram calcium=0.96 gram acid. The actual amount of acid in this formulation is 2.01 grams per unit dose, and as expected the powdered mix formulation dissolved with minimal calcium sedimentation in less than about 60 seconds. The actual calcium dissolution time as determined by the Simulated Hand Stirring Test is less than 30 seconds. The powdered pink lemonade beverage mix of this experiment tastes good with no chalky aftertaste.

A consumer test was conducted whereby nine subjects were each given a 400-gram can of pink lemonade powdered mix, a pitcher of cold water, a spoon, and a clear glass. The only instruction was for them to make a glass of pink lemonade, as they would normally constitute a powdered beverage mix. This test therefore allowed the consumers to use different volumes of water, different amounts of powdered mix, different sequences of addition (water to powdered mix or powdered mix to water), and different stirring times.

After constitution, the liquid was observed for calcium sedimentation and then the volume of liquid was measured to estimate the amount of water used by a consumer. The sequence in Table 6 below is listed as either 1 or 2 where sequence 1 means that the subject added the powdered mix first to the glass followed by water, and vice versa for sequence 2. The weight of the dry mix in Table 6 was estimated by noting that one tablespoon of the powdered mix is about 15 grams.

TABLE 6

| Subject | Sequence | Volume water | Weight Mix | Stirring Time | Calcium Dissolution |
|---|---|---|---|---|---|
| 1 | 1 | 194 ml | 37.5 g | 23 sec | Dissolved |
| 2 | 1 | 200 ml | 30 g | 20 sec | Dissolved |
| 3 | 1 | 206 ml | 30 g | 28 sec | Dissolved |
| 4 | 1 | 120 ml | 30 g | 30 sec | Dissolved |
| 5 | 1 | 256 ml | 30 g | 18 sec | Dissolved |
| 6 | 1 | 213 ml | 45 g | 36 sec | Dissolved |
| 7 | 1 | 198 ml | 30 g | 15 sec | Dissolved |
| 8 | 1 | 245 ml | 37.5 g | 17 sec | Dissolved |
| 9 | 2 | 144 ml | 30 g | 54 sec | Dissolved |
| Average | — | 198 ml | 33 g | 27 sec | — |

It is noted from Table 6 that in general, consumers added the water to the powdered mix. The amount of water varied from 120 ml to 256 ml, the unit dose from 30 grams to 45 grams, and the stirring time from 15–54 seconds. In all these variations, the calcium of the powdered mix dissolved rapidly with no visible calcium sedimentation.

Experiment 10

The following formulation using a sugar combination of sucrose and fructose was prepared.

TABLE 7

| Ingredients | % w/w | in 19.2 grams (unit dose) |
|---|---|---|
| Sucrose (through mesh 20) | 16.7% | 3.2 g |
| Fructose | 66.7% | 12.8 g |
| Citric Acid | 10.4% | 2.00 g |
| Calcium Hydroxide-97% | 3% | 0.57 g (300 mg calcium) |
| Yellow 6 | 0.03% | 6 mg |
| Yellow 5 | 0.04% | 8 mg |
| Orange Flavors | 1.71% | 329 mg |
| Xanthan Gum | 0.31% | 60 mg |
| Cloudifier Permaseal ® | 0.78% | 150 mg |
| Tricalcium Phosphate | 0.3% | 58 mg |

The sugar and dyes were loaded into the sigma mixer and blended for 15 minutes. Citric acid and Tricalcium phosphate were then added to the mixer and blended for 15 minutes, after which calcium hydroxide, xanthan gum, and the cloudifier were added and blended for another 15 minutes. Finally, the flavors were added and the final mix blended for 15 minutes.

A unit dose of this powdered orange beverage mix is 19.2 grams. The total sugar is 3.2+12.8=16 grams. The sugar/calcium weight ratio is 16/0.3=53.33. The calculation of the minimum acid required is as follows:

1. Assuming all the sugar is sucrose at X=53.333, the calculated $Y_p$ from equation (1) is −2.3566, and $Y_{Lower\ Limit}$ from equation (3) is −2.6402, therefore the $Acid_{Lower\ Limit}$ from equation (4)=16 exp (−2.6404)= 1.14 grams.
2. Assuming all the sugar is fructose, X=53.333 is greater than 45, so the amount of acid required must be equal to than the acid required for complete neutralization which in this case is 3.20 grams acid/gram calcium×0.3 gram calcium=0.96 gram acid.
3. The $Acid_{Lower\ Limit}$ for the combination sugar (20% sucrose, 80% fructose) according to equation (10) is:

$$Acid_{Lower\ Limit}=0.2\times1.14\ grams+0.8\times0.96\ grams=1.0\ gram$$

The actual amount of acid in this formulation is 2.00 grams/dose, much greater than $Acid_{Lower\ Limit}$ of 1.0 gram/dose, and therefore as expected the formulation dissolved with minimal calcium sedimentation in less than about 60 seconds. The powdered orange beverage mix of this experiment tastes good with no chalky aftertaste.

Experiment 11

The following formulation similar to Example 1 of U.S. Pat. No. 4,851,221, and using an artificial sweetener was prepared.

TABLE 8

| Ingredients | % w/w | in 2.90 grams (unit dose) |
|---|---|---|
| Calcium Hydroxide-97% | 32% | 0.93 (490 mg calcium) |
| Citric Acid | 66% | 1.92 g |
| Lemon Flavors | 0.8% | 23.2 mg |
| Aspartame | 1.2% | 34.8 mg |

When subjected to the Simulated Hand Stirring Test, the powdered mix did not dissolve after more than ten minutes of stirring. When only half of the unit dose was used (1.45 gram delivering 245 mg calcium) in the Simulated Hand Stirring Test, the product still did not dissolve after more than ten minutes of stirring.

When three subjects were asked to stir by hand as vigorously as possible 1.45 gram of the powdered mix in 200 ml of water, all subjects tired out before significant calcium dissolution occurred.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A powdered beverage mix, comprising:
   i) flavor(s);
   ii) calcium hydroxide;
   iii) an organic acid selected from citric acid, malic acid, and combinations thereof; and
   iv) a sugar selected from sucrose, fructose, glucose, or binary and ternary combinations thereof;
   the powdered beverage mix being further characterized by a calcium dissolution time of less than about 60 seconds when tested according to the Simulated Hand Stirring Test, wherein the amount of calcium from calcium hydroxide is from about 100 mg to about 600 mg per unit dose.

2. The powdered beverage mix of claim 1, wherein the average particle size of the calcium hydroxide is less than about 30 micron.

3. The powdered beverage mix of claim 2, wherein the average particle size of the calcium hydroxide is less than about 20 micron.

4. The powdered beverage mix of claim 3, wherein the average particle size of the calcium hydroxide is less than about 10 micron.

5. The powdered beverage mix of claim 1, wherein the average particle size by weight of the sugar is less than about 841 micron.

6. The powdered beverage mix of claim 5, wherein the average particle size by weight of the sugar is less than about 595 micron.

7. The powdered beverage mix of claim 1, further comprising one or more additives selected from the group consisting of colorants, preservatives, cloudifiers, high-intensity sweeteners, vitamins arid minerals, anticaking agents, pH modifiers, viscosity modifiers, bodying agents, antioxidants, and emulsifying agents, and mixtures thereof.

8. The powdered beverage mix of claim 1, wherein the sugar, calcium hydroxide, and organic acid comprise more than about 85% w/w of the powdered beverage mix.

9. The powdered beverage mix of claim 8, wherein the sugar, calcium hydroxide, and organic acid comprise more than about 90% w/w of the powdered beverage mix.

10. The powdered beverage mix of claim 9, wherein the sugar, calcium hydroxide, and organic acid comprise more than about 95% w/w of the powdered beverage mix.

11. The powdered beverage mix of claim 1, wherein the sugar is sucrose with a sucrose/calcium weight ratio equal to or greater than 20, and where the organic acid per unit dose is:
   i) for sucrose/calcium weight ratio less than 60: the amount of acid is equal to or greater than the amount of acid calculated from the 95% lower prediction limit of FIG. 2;
   ii) for sucrose/calcium weight ratio equal to or greater than 60: the amount of acid is equal to or greater than the amount of acid required to completely neutralize the calcium hydroxide.

12. The powdered beverage mix of claim 11, wherein the amount of calcium from calcium hydroxide is from about 100 mg to about 600mg per unit dose.

13. The powdered beverage mix of claim 11, wherein the average particle size of the calcium hydroxide is less than about 30 micron.

14. The powdered beverage mix of claim 13, wherein the average particle size of the calcium hydroxide is less than about 20 micron.

15. The powdered beverage mix of claim 14, wherein the average particle size of the calcium hydroxide is less than about 10 micron.

16. The powdered beverage mix of claim 11, wherein the average particle size by weight of the sugar is less than about 841 micron.

17. The powdered beverage mix of claim 16, wherein the average particle size by weight of the sugar is less than about 595 micron.

18. The powdered beverage mix of claim 11, further comprising one or more additives selected from the group consisting of colorants, preservatives, cloudifiers, high-intensity sweeteners, vitamins and minerals, anticaking agents, pH modifiers, viscosity modifiers, bodying agents, antioxidants, and emulsifying agents, and mixtures thereof.

19. The powdered beverage mix of claim 11, wherein the sugar, calcium hydroxide, and organic acid comprise more than about 85% w/w of the powdered beverage mix.

20. The powdered beverage mix of claim 19, wherein the sugar, calcium hydroxide, and organic acid comprise more than about 90% w/w of the powdered beverage mix.

21. The powdered beverage mix of claim 20, wherein the sugar, calcium hydroxide, and organic acid comprise more than about 95% w/w of the powdered beverage mix.

22. The powdered beverage mix of claim 1, wherein the sugar is the monosaccharide fructose, glucose, or combinations thereof, with a mononosaccharide/calcium weight ratio equal to or greater than 20, and where the organic acid per unit dose is:
  i) for monosaccharide/calcium weight ratio less than 45: the amount of acid is equal to or greater than the amount of acid calculated from the 95% lower prediction limit of FIG. 4;
  ii) for monosaccharide/calcium weight ratio equal to or greater than 45: the amount of acid is equal to or greater than the amount of acid required to completely neutralize the calcium hydroxide.

23. The powdered beverage mix of claim 22, wherein the amount of calcium from calcium hydroxide is from about 100 mg to about 600 mg per unit dose.

24. The powdered beverage mix of claim 22, wherein the average particle size of the calcium hydroxide is less than about 30 micron.

25. The powdered beverage mix of claim 24, wherein the average particle size of the calcium hydroxide is less than about 20 micron.

26. The powdered beverage mix of claim 25, wherein the average particle size of the calcium hydroxide is less than about 10 micron.

27. The powdered beverage mix of claim 22, wherein the average particle size by weight of the sugar is less than about 841 micron.

28. The powdered beverage mix of claim 27, wherein the average particle size by weight of the sugar is less than about 595 micron.

29. The powdered beverage mix of claim 22, further comprising one or more additives selected from the group consisting of colorants, preservatives, cloudifiers, high-intensity sweeteners, vitamins and minerals, anticaking agents, pH modifiers, viscosity modifiers, bodying agents, antioxidants, and emulsifying agents, and mixtures thereof.

30. The powdered beverage mix of claim 22, wherein the sugar, calcium hydroxide, and organic acid comprise more than about 85% w/w of the powdered beverage mix.

31. The powdered beverage mix of claim 30, wherein the sugar, calcium hydroxide, and organic acid comprise more than about 90% w/w of the powdered beverage mix.

32. The powdered beverage mix of claim 31, wherein the sugar, calcium hydroxide, and organic acid comprise more than about 95% w/w of the powdered beverage mix.

33. The powdered beverage mix of claim 1, wherein the sugar is a combination of:
  i) the monosaccharide fructose, glucose, or mixtures thereof; and
  ii) sucrose, and wherein the sugar/calcium weight ratio is equal to or greater than 20, and wherein the organic acid per unit dose is equal to or greater than the amount calculated from:

$$\text{Acid} = \text{fraction sucrose} \times (\text{acid required assuming all the sugar is sucrose}) + \text{fraction monosaccharide} \times (\text{acid required assuming all the sugar is monosaccharide})$$

where the "acid required assuming all the sugar is Sucrose" is determined from:
  i) for sucrose/calcium weight ratio equal to or greater than 20 but less than 60: the amount of acid is equal to the amount of acid calculated from the 95% lower prediction limit of FIG. 2;
  ii) for sucrose/calcium weight ratio equal to or greater than 60: the amount of acid is equal to the amount of acid required to completely neutralize the calcium hydroxide:

and where the "acid required assuming all the sugar is monosaccharide" is determined from:
  i) for monosaccharide/calcium weight ratio equal to or greater than 20 but less than 45: the amount of acid is equal to the amount of acid calculated from the 95% lower prediction limit of FIG. 4;
  ii) for monosaccharide/calcium weight ratio equal to or greater than 45: the amount of acid is equal to the amount of acid required to completely neutralize the calcium hydroxide.

34. The powdered beverage mix of claim 33, wherein the amount of calcium from calcium hydroxide is from about 100 mg to about 600 mg per unit dose.

35. The powdered beverage mix of claim 33, wherein the average particle size of the calcium hydroxide is less than about 30 micron.

36. The powdered beverage mix of claim 35, wherein the average particle size of the calcium hydroxide is less than about 20 micron.

37. The powdered beverage mix of claim 36, wherein the average particle size of the calcium hydroxide is less than about 10 micron.

38. The powdered beverage mix of claim 33, wherein the average particle size by weight of the sugar is less than about 841 micron.

39. The powdered beverage mix of claim 38, wherein the average particle size by weight of the sugar is less than about 595 micron.

40. The powdered beverage mix of claim 33, further comprising one or more additives selected from the group consisting of colorants, preservatives, cloudifiers, high-intensity sweeteners, vitamins and minerals, anticaking agents, pH modifiers, viscosity modifiers, bodying agents, antioxidants, and emulsifying agents, and mixtures thereof.

41. The powdered beverage mix of claim 33, wherein the sugar, calcium hydroxide, and organic acid comprise more than about 85% w/w of the powdered beverage mix.

42. The powdered beverage mix of claim 41, wherein the sugar, calcium hydroxide, and organic acid comprise more than about 90% w/w of the powdered beverage mix.

43. The powdered beverage mix of claim 42, wherein the sugar, calcium hydroxide, and organic acid comprise more than about 95% w/w of the powdered beverage mix.

* * * * *

UNITED STATES PATENT AND TRADEMARK OFFICE
CERTIFICATE OF CORRECTION

| | | |
|---|---|---|
| PATENT NO. | : 6,833,146 B2 | Page 1 of 1 |
| APPLICATION NO. | : 10/190968 | |
| DATED | : December 21, 2004 | |
| INVENTOR(S) | : Donna L. Valencia, Sarah A. Calapini and Kennie U. Dee | |

It is certified that error appears in the above-identified patent and that said Letters Patent is hereby corrected as shown below:

FACE OF PATENT

On the title of the invention please delete the first word "POWERED" and replace with -- POWDERED -- to read:

--(54)  POWDERED BEVERAGE MIX WITH RAPIDLY
        DISSOLVING CALCIUM--

Signed and Sealed this

Twenty-ninth Day of May, 2007

JON W. DUDAS
*Director of the United States Patent and Trademark Office*